United States Patent
Wu et al.

(10) Patent No.: US 8,232,891 B2
(45) Date of Patent: Jul. 31, 2012

(54) INDICATOR LIGHT

(75) Inventors: Ming-Shu Wu, Taipei Hsien (TW); Chun-Chih Yu, Taipei Hsien (TW); Cheng-Shu Ho, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 564 days.

(21) Appl. No.: 12/497,753

(22) Filed: Jul. 6, 2009

(65) Prior Publication Data

US 2010/0127858 A1    May 27, 2010

(30) Foreign Application Priority Data

Nov. 26, 2008  (CN) .......................... 2008 1 0305734

(51) Int. Cl.
*G08B 21/00*    (2006.01)

(52) U.S. Cl. .............. 340/815.5; 340/815.45; 340/691.1

(58) Field of Classification Search ............... 340/815.4, 340/815.45, 691.1–691.4, 815.5
See application file for complete search history.

(56) References Cited

U.S. PATENT DOCUMENTS

| 7,579,959 B2 * | 8/2009 | Choo ........................ 340/815.45 |
| 2006/0138967 A1 * | 6/2006 | Zhou et al. ..................... 315/129 |
| 2009/0054068 A1 * | 2/2009 | Halkka et al. ................. 455/445 |

* cited by examiner

*Primary Examiner* — Jeffery Hofsass
(74) *Attorney, Agent, or Firm* — Altis Law Group, Inc.

(57) ABSTRACT

An indicator light includes a first ring shaped light and a second ring shaped light. The first ring shaped light is divided into two first curved lights. One of the first curved lights is configured to indicate a system status of an electronic device. The other one of the first curved lights is configured to indicate a connection status of a network of the electronic device. The second ring shaped light is configured to indicate a working status of at least one data storage device of the electronic device.

19 Claims, 8 Drawing Sheets

INDICATOR LIGHT

BACKGROUND

1. Technical Field

The present disclosure generally relates to indicator lights, especially to an indicator light for indicating a working status of an electronic device.

2. Description of Related Art

Indicating lights may be set on electronic devices for indicating working statuses of the electronic devices. For example, a conventional computer has two hemispheric light-emitting diode (LED) indicator lights for indicating a power status of the computer and a read/write status of disk drives in the computer. Each conventional indicator light could indicate one corresponding status of the computer. However, these indicator lights are placed in different locations on the indicator and so users are unable to determine the various statuses at a single glance.

DETAILED DESCRIPTION

Figure 1:
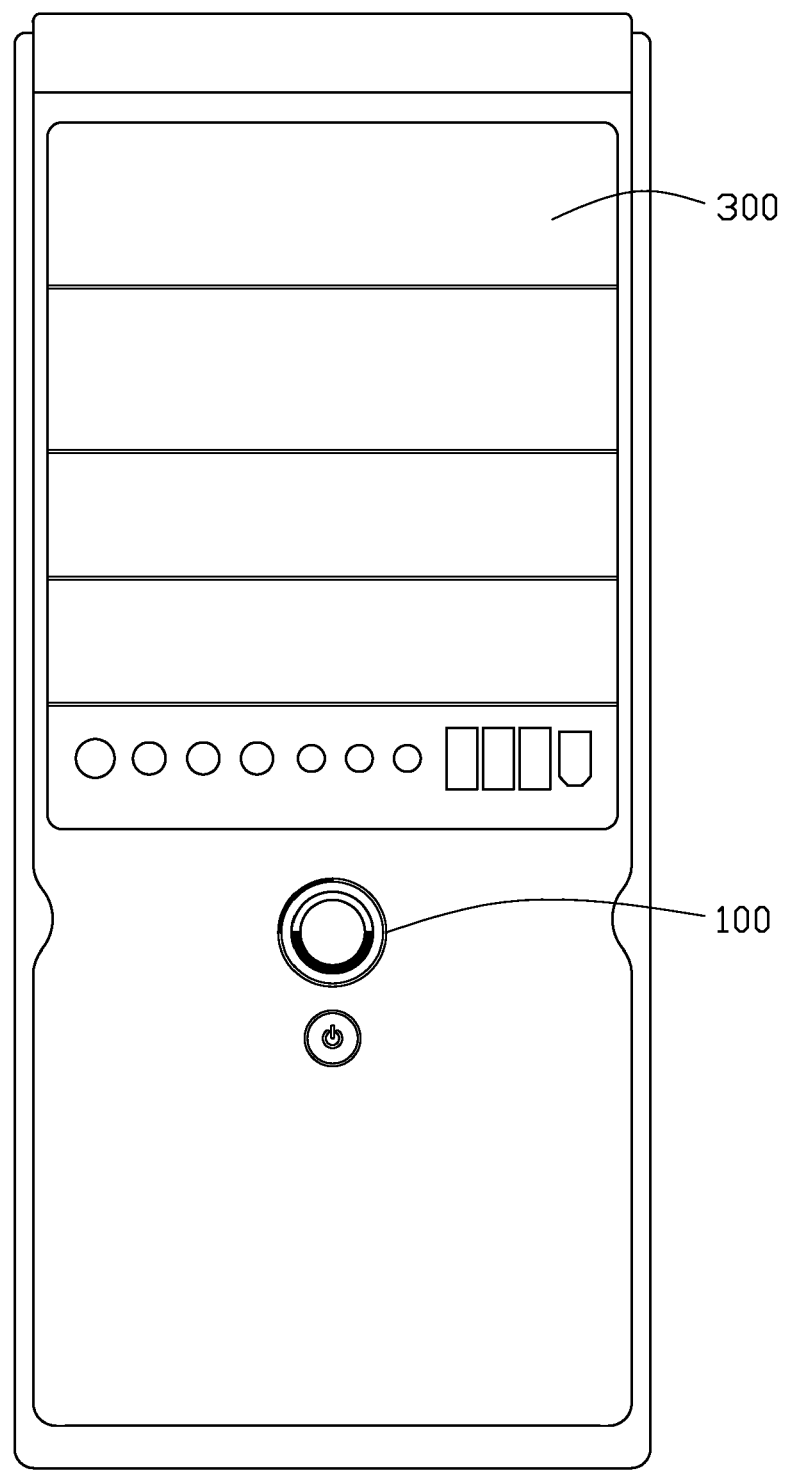
FIG. 1 is a schematic view of an electronic device with an indicator light.
Figure 2:
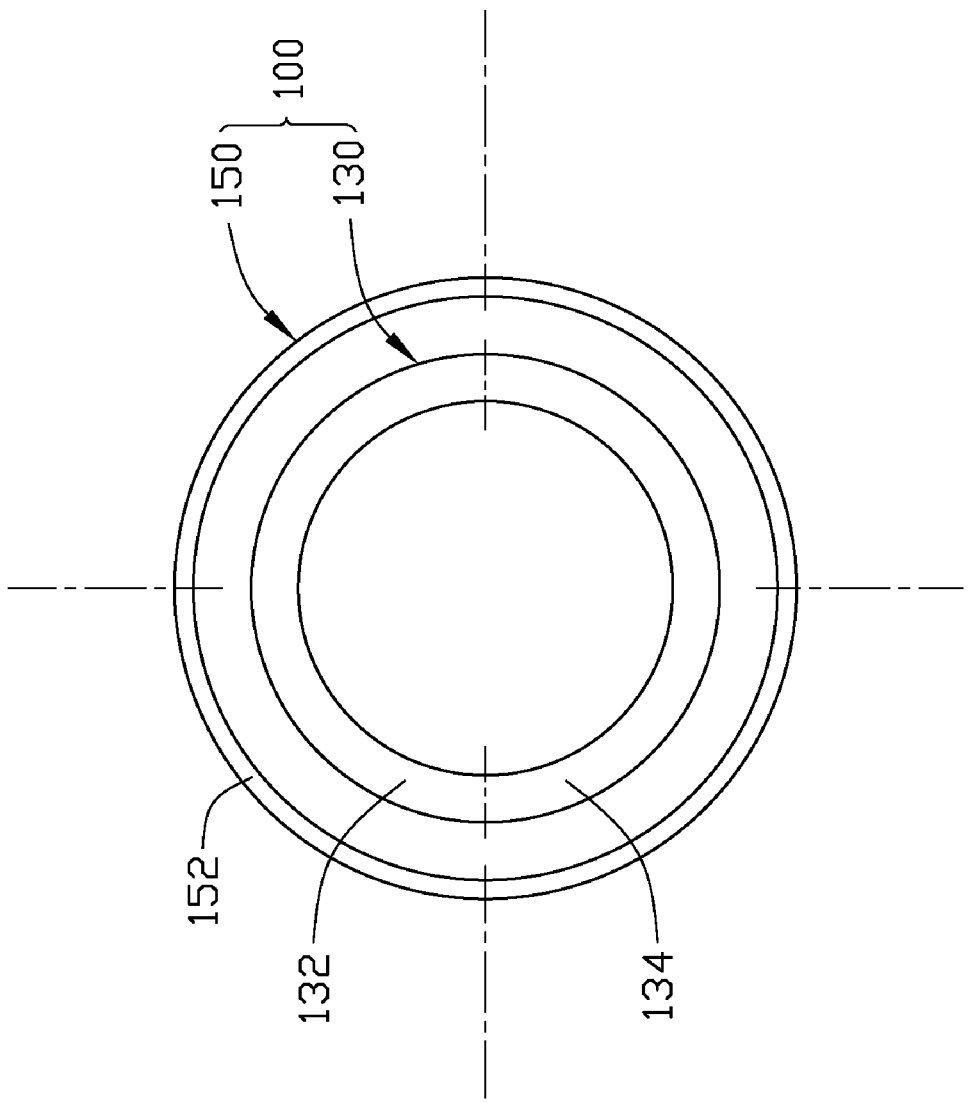
FIG. 2 is a front schematic view of an indicator light of a first embodiment.
Figure 3:
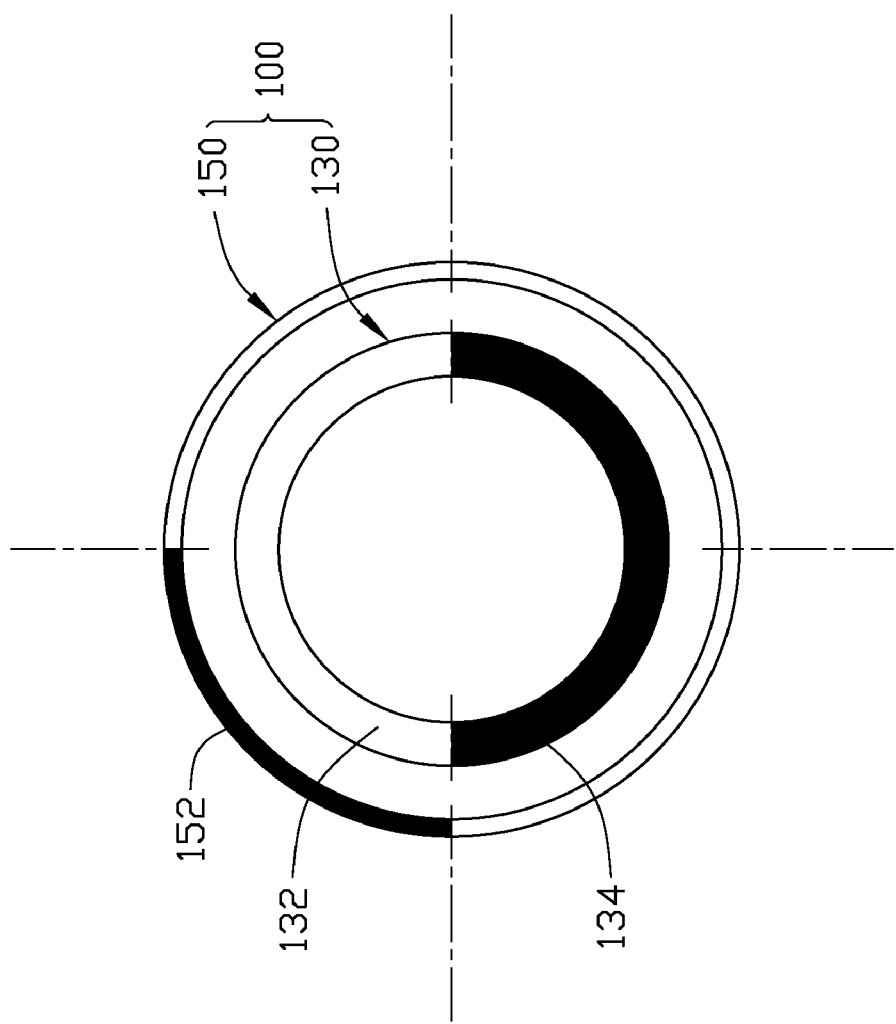
FIG. 3 is similar to FIG. 2, but showing some curved lights of the indicator light are lit.
Figure 4:
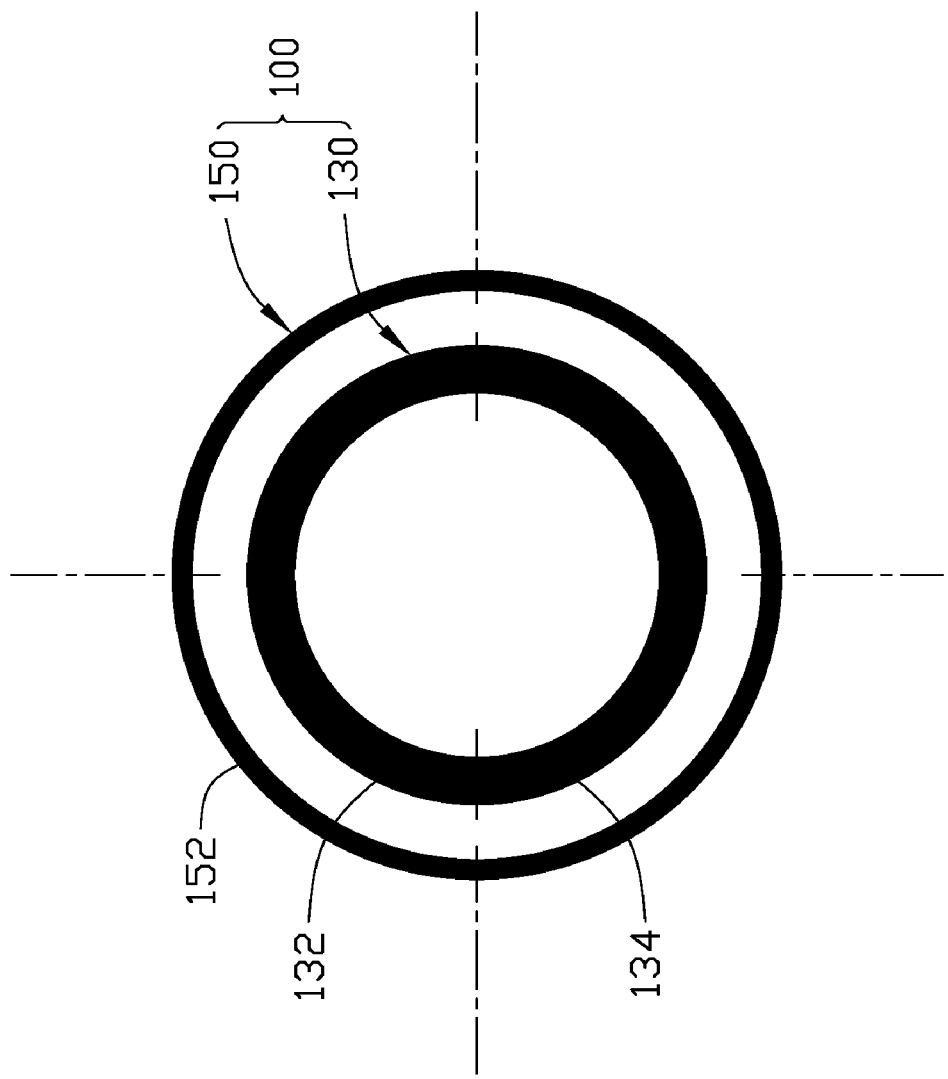
FIG. 4 is similar to FIG. 2, but showing all curved lights of the indicator light are lit.

Referring to FIG. 1 through FIG. 4, an indicator light 100 is used for indicating a plurality of working statuses of an electronic device 300. In a first embodiment, the indicator light 100 includes a first ring shaped light 130 and a second ring shaped light 150. The first ring shaped light 130 and the second ring shaped light 150 are concentric. A diameter of the second ring shaped light 130 is larger than that of the first ring shaped light 130, so that the first ring shaped light 130 is disposed in the second ring shaped light 150. The difference between the inner radius and the outer radius of the first ring shaped light 130 is greater than the difference between the inner and outer radius of the second ring shaped light 150. The first ring shaped light 130 is transversely divided into two first curved lights: an upper first semi-ring shaped light 132 and a lower first semi-ring shaped light 134. If there is more than one data storage device in the electronic device 300, the second ring shaped light 150 is divided into a matching number of second curved lights 152. In the present embodiment, four data storage devices are provided in the electronic device 300, therefore the second ring shaped light 150 is divided into four second curved lights 152. Each of the first curved lights and each second curved light 152 have one light emitting diode (LED) therein. Each of the first curved lights and each of the second curved lights 152 may be configured to illuminate in more than one color.

An example of the indicating manners of the upper first semi-ring shaped light 132, the lower first semi-ring shaped light 134, and each of the second curved lights 152 are listed in the following table:

| Curved lights | System/Component Statuses of the electronic device | Statuses of corresponding curved lights | Colors of corresponding curved lights |
|---|---|---|---|
| Lower first semi-ring shaped light 134 | Power off | Off | N/A |
| | Booting | Flashing (Frequency: 1 time/second) | White or Blue |
| | Power on | On | White or Blue |
| | Power failure | Flashing (Frequency: 2 Seconds On after 1 Second Off) | Red |
| Upper first semi-ring shaped light 132 | Network not connected | Off | N/A |
| | Network connected | On | White or Blue |
| | Occurrence of Input/output network traffic | Flashing | White or Blue |
| | Network failure | On | Red |
| Second curved light 152 | Data storage device not mounted | Off | Yellow |
| | Data storage device on | On | White or Blue |
| | Reading/writing status of data storage device | Flashing | White or Blue |

In the first embodiment, the color of corresponding curved lights may be changed for greater contrast or aesthetics according to a color of the electronic device 300. For example, if the electronic device 300 has a white enclosure, the curved lights may be configured to emit blue light; if the electronic device 300 has a blue enclosure, the curved lights may be configured to emit white light. The flashing frequency of the curved lights may be adjusted. The electronic device 300 may be one of a computer, a mobile phone, a server, and other similar electronic devices. The first ring shaped light 130 may be divided into any number of segments as needed. Other working statuses of the electronic device 300 may also be indicated by the curved lights if desired.

Figure 5:
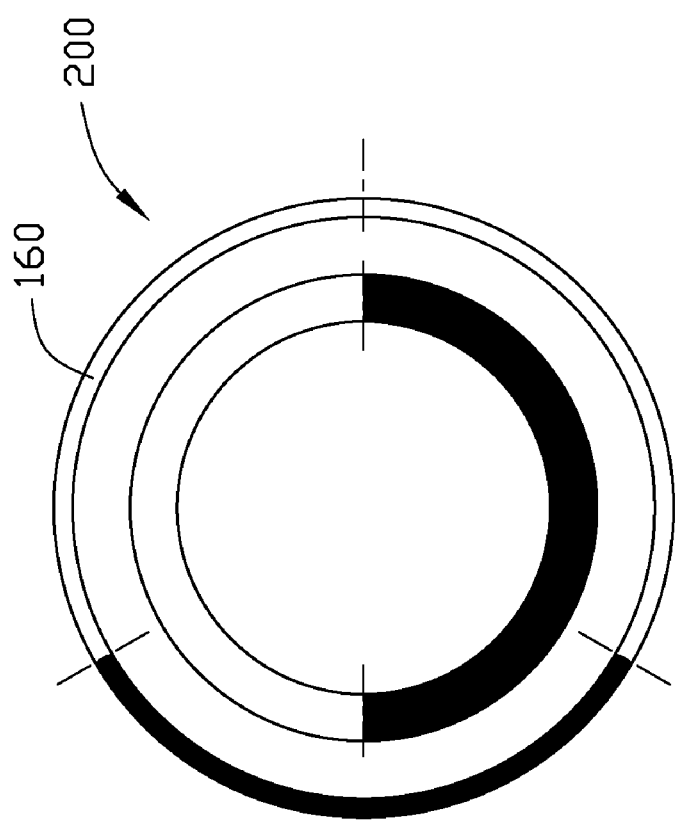
FIG. 5 is a front schematic view of an indicator light of a second embodiment.

Referring to FIG. 5, in a second embodiment, three data storage devices are provided in the electronic device 300. An indicator light 200 includes a second ring shaped light 160. The second ring shaped light 160 is divided into three segments with each segment configured to indicate status of a corresponding one of the data storage devices.

Figure 6:
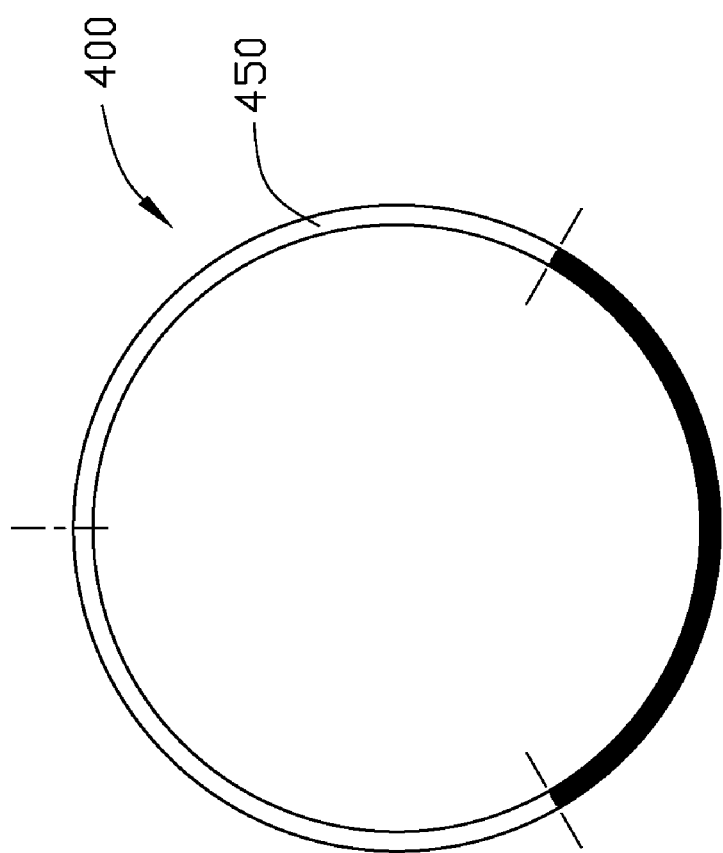
FIG. 6 is a front schematic view of an indicator light of a third embodiment.

Referring to FIG. 6, in a third embodiment, an indicator light 400 includes only one ring shaped light 450. The ring shaped light 450 is configured to indicate working statuses of the electronic device 300.

Figure 7:
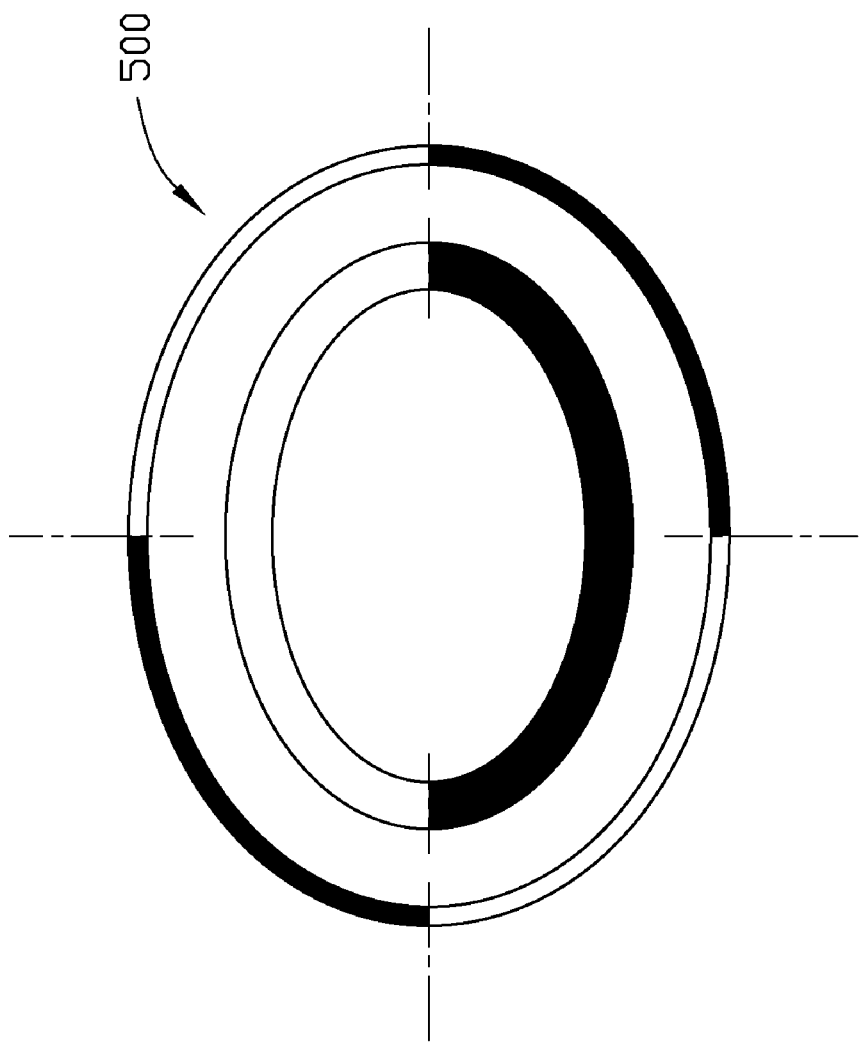
FIG. 7 is a front schematic view of an indicator light of a fourth embodiment.

Referring to FIG. 7, in a fourth embodiment, an indicator light 500 includes two concentric elliptical shaped lights. Each elliptical shaped light may be configured to indicate at least one working status of the electronic device 300.

Figure 8:
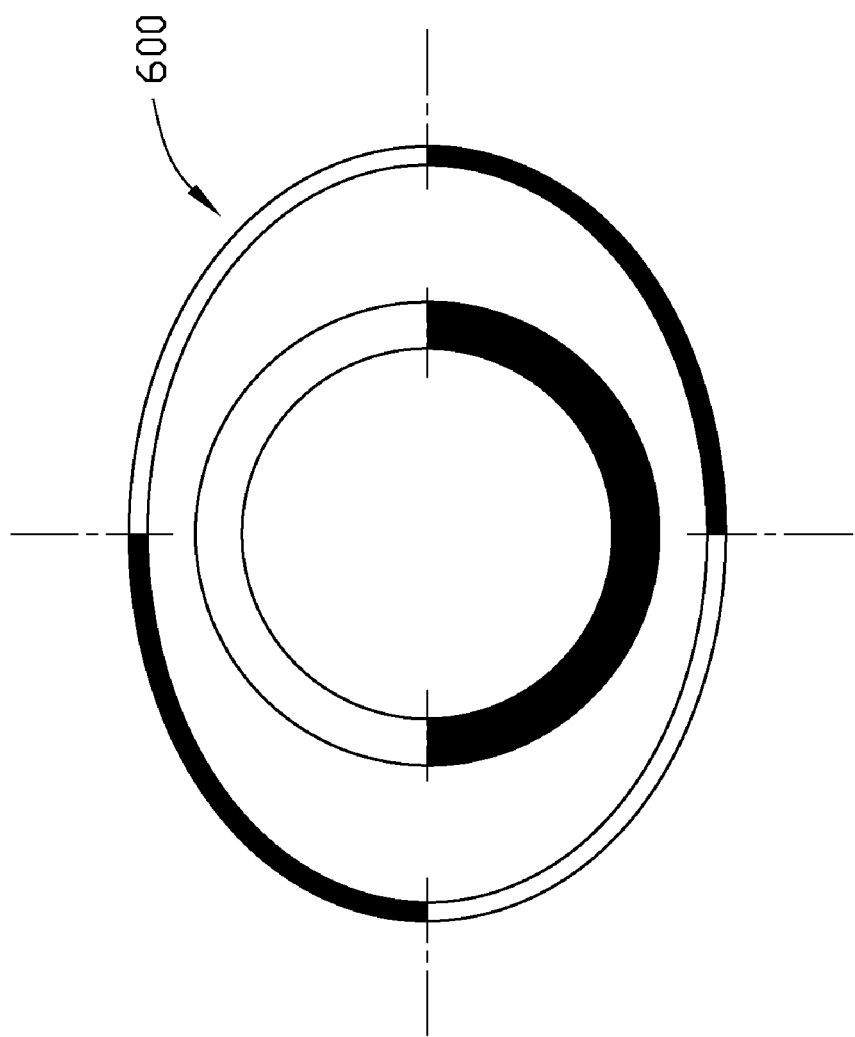
FIG. 8 is a front schematic view of an indicator light of a fifth embodiment.

Referring to FIG. 8, in a fifth embodiment, an indicator light 600 includes a ring shaped light and an elliptical shaped light. Each of the ring shaped light and the elliptical shaped light may be configured to indicate at least one working status of the electronic device 300.

In any one of above embodiments, a whole ring may be lit when the electronic device 300 is working in normally. The working statuses of the electronic device 300 can be determined at a glance by a user.

It is to be understood, however, that even though numerous characteristics and advantages of the present embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An indicator light comprising:
  a first ring shaped light, the first ring shaped light being divided into two first curved lights, one of the first curved lights configured to indicate a system status of an electronic device, and the other one of the first curved lights configured to indicate a network connection status of the electronic device; and
  a second ring shaped light configured to indicate a working status of at least one data storage device of the electronic device.

2. The indicator light of claim 1, wherein the first ring shaped light and the second ring shaped light are circle ring shaped lights.

3. The indicator light of claim 1, wherein the first ring shaped light and the second ring shaped light are concentric.

4. The indicator light of claim 1, wherein on the condition that more than one data storage device in the electronic device is provided, the second ring shaped light is divided into a matching number of second curved lights, and each second curved light is configured to indicate a working status of each data storage device.

5. The indicator light of claim 1, wherein each of the first curved lights has one light emitting diode therein.

6. The indicator light of claim 1, wherein each of the first curved lights is configured to illuminate in more than one color.

7. The indicator light of claim 1, wherein the first ring shaped light is disposed inside the second ring shaped light, and the difference between the inner radius and the outer radius of the first ring shaped light is greater than the difference between the inner and outer radius of the second ring shaped light.

8. The indicator light of claim 1, wherein the network connection status is one of a network unconnected status, a network connected status and an input/output network traffic status; and the network unconnected status is indicated by an off status of the corresponding first curved light, the network connected status is indicated by an on status of the corresponding first curved light, and the input/output network traffic status is indicated by a flashing status of the corresponding first curved light.

9. The indicator light of claim 1, wherein the system status of the electronic device is one of a power off status, a booting status, an power on status and a power failure status of the electronic device; and the power off status of the electronic device is indicated by an off status of the corresponding first curved light, a booting status of the electronic device is indicated by a flashing status of the corresponding first curved light at a first frequency, the power on status of the electronic device is indicated by an on status of the corresponding first curved light and the power failure status of the electronic device is indicated by a flashing status of the corresponding first curved light at a second frequency.

10. An electronic device assembly comprising:
  an electronic device; and
  a first ring shaped light arranged on the electronic device, the first ring shaped light being divided into at least two first curved lights, and each of the at least two first curved lights configured to indicate one working status of the electronic device in one indicate manner;
  wherein the at least two first curved lights comprise three first curved lights, a working status of the three first curved lights comprises a system status, a network connection status and a reading/writing status of at least one data storage device.

11. The electronic device assembly of claim 10, wherein the ring shaped light is elliptical shaped light.

12. The electronic device assembly of claim 10, wherein the network connection status is one of a network unconnected status, a network connected status and an input/output network traffic status; and the network unconnected status is indicated by an off status of the corresponding first curved light, the network connected status is indicated by an on status of the corresponding first curved light, and the input/output network traffic status is indicated by a flashing status of the corresponding first curved light.

13. The electronic device assembly of claim 10, wherein the system status of the electronic device is one of a power off status, a booting status, an power on status and a power failure status of the electronic device; and the power off status of the electronic device is indicated by an off status of the corresponding first curved light, a booting status of the electronic device is indicated by a flashing status of the corresponding first curved light at a first frequency, the power on status of the electronic device is indicated by an on status of the corresponding first curved light and the power failure status of the electronic device is indicated by a flashing status of the corresponding first curved light at a second frequency.

14. The electronic device assembly of claim 10, wherein each of the at least one first curved light has one light emitting diode therein.

15. The electronic device assembly of claim 10, wherein each of the first curved lights is configured to illuminate in more than one color.

16. The electronic device assembly of claim 10, wherein the indicate manner is one of an off status of the corresponding first curved light, a flashing status of the corresponding first curved light and an on status of the corresponding first curved light.

17. The electronic device assembly of claim 10 further comprising a second ring shaped light, the second ring shaped light is concentric to the first ring shaped light, and the second ring shaped light is capable of indicating the other working status of the electronic device different from the working status indicated by the first ring shaped light.

18. The electronic device assembly of claim 17, wherein the first ring shaped light is disposed in the second ring shaped light; and the difference between the inner radius and the outer radius of the first ring shaped light is greater than the difference between the inner and outer radius of the second ring shaped light.

19. The electronic device assembly of claim 17, wherein the second ring shaped light is capable of indicating a working status of at least one data storage device in the electronic device; on the condition that more than one data storage device in the electronic device is provided, the second ring shaped light is divided into a matching number of second curved lights, and each second curved light is configured to indicate a working status of each data storage device.

* * * * *